United States Patent
Xiang

(10) Patent No.: US 10,708,775 B2
(45) Date of Patent: Jul. 7, 2020

(54) METHOD FOR ESTABLISHING NETWORK CONNECTION BY USING WPS, AND MOBILE WI-FI DEVICE

(71) Applicant: Huawei Technologies Co., Ltd., Shenzhen (CN)

(72) Inventor: Chao Xiang, Xi'an (CN)

(73) Assignee: HUAWEI TECHNOLOGIES Co., LTD., Shenzhen (CN)

( * ) Notice: Subject to any disclaimer, the term of this patent is extended or adjusted under 35 U.S.C. 154(b) by 168 days.

(21) Appl. No.: 15/505,315

(22) PCT Filed: Aug. 22, 2014

(86) PCT No.: PCT/CN2014/085034
§ 371 (c)(1),
(2) Date: Feb. 21, 2017

(87) PCT Pub. No.: WO2016/026144
PCT Pub. Date: Feb. 25, 2016

(65) Prior Publication Data
US 2017/0273120 A1    Sep. 21, 2017

(51) Int. Cl.
*H04W 12/06* (2009.01)
*H04W 76/10* (2018.01)
(Continued)

(52) U.S. Cl.
CPC ........... *H04W 12/06* (2013.01); *H04L 63/205* (2013.01); *H04W 12/003* (2019.01);
(Continued)

(58) Field of Classification Search
CPC .... H04L 63/205; H04W 12/04; H04W 12/06; H04W 84/12; H04W 88/04; H04W 88/06;
(Continued)

(56) References Cited

U.S. PATENT DOCUMENTS 6,894,992 B1 * 5/2005 Morvan ................ H04W 84/20
370/329
7,159,042 B1 * 1/2007 Morvan ............... H04B 7/2687
370/324
(Continued)

FOREIGN PATENT DOCUMENTS

CN   102204391 A   9/2011
CN   102378404 A   3/2012
(Continued)

OTHER PUBLICATIONS

Machine Translation and Abstract of Japanese Application No. JP2010056951, Mar. 11, 2010, 16 pages.
(Continued)

*Primary Examiner* — Dung B Huynh
(74) *Attorney, Agent, or Firm* — Conley Rose, P.C.

(57) ABSTRACT

An access network method using WPS includes: receiving, by a mobile Wi-Fi device, a connection request sent by a user equipment (UE); determining, according to the connection request, that the UE enables a connection mode of a WPS function, where the connection mode includes an access point mode and a station mode; enabling, according to the connection mode, a WPS interface, of the mobile Wi-Fi device, that is corresponding to the connection mode; and establishing a WPS network connection to the UE by using the WPS interface.

12 Claims, 4 Drawing Sheets

(51) Int. Cl.
*H04L 29/06* (2006.01)
*H04W 12/00* (2009.01)
*H04W 84/12* (2009.01)
*H04W 88/04* (2009.01)

(52) U.S. Cl.
CPC ............ *H04W 76/10* (2018.02); *H04W 84/12* (2013.01); *H04W 88/04* (2013.01)

(58) Field of Classification Search
CPC ............... H04W 84/20; H04W 12/003; H04W 76/10–19
See application file for complete search history.

(56) References Cited

U.S. PATENT DOCUMENTS

| | | | | |
|---|---|---|---|---|
| 2002/0055978 A1* | 5/2002 | Joon-Bo | ............... | H04W 84/20 709/209 |
| 2004/0018848 A1* | 1/2004 | Ogino | ..................... | H04W 4/06 455/519 |
| 2005/0033816 A1* | 2/2005 | Yamaguchi | ........... | H04W 84/20 709/208 |
| 2006/0072525 A1* | 4/2006 | Hillyard | .................. | H04W 4/80 370/338 |
| 2007/0015516 A1* | 1/2007 | Huotari | ................. | H04W 64/00 455/456.1 |
| 2007/0060128 A1* | 3/2007 | Kil | ........................ | H04W 88/08 455/436 |
| 2007/0226351 A1* | 9/2007 | Fischer | ................. | H04W 76/14 709/227 |
| 2007/0297347 A1* | 12/2007 | Ikeda | ..................... | H04W 84/20 370/254 |
| 2008/0026788 A1* | 1/2008 | Hamada | ................ | H04W 72/02 455/552.1 |
| 2008/0151848 A1* | 6/2008 | Fischer | ............. | H04W 56/0015 370/338 |
| 2009/0034477 A1* | 2/2009 | Yamaguchi | ........... | H04W 84/20 370/331 |
| 2010/0008339 A1* | 1/2010 | Huang | .................. | H04W 48/18 370/338 |
| 2010/0074155 A1* | 3/2010 | Park | ...................... | H04W 76/15 370/310 |
| 2010/0265928 A1* | 10/2010 | Peng | ..................... | H04L 63/061 370/338 |
| 2010/0291954 A1* | 11/2010 | Nakajima | ............... | H04W 8/24 455/507 |
| 2010/0296455 A1* | 11/2010 | Nakajima | ............... | H04W 84/20 370/328 |
| 2011/0158212 A1* | 6/2011 | Sakai | .................... | H04W 8/005 370/338 |
| 2011/0170484 A1* | 7/2011 | Nagai | .................. | H04W 88/02 370/328 |
| 2011/0205971 A1* | 8/2011 | Ito | ......................... | H04W 88/06 370/328 |
| 2011/0208968 A1* | 8/2011 | Inada | ................... | H04L 63/065 713/171 |
| 2011/0222517 A1* | 9/2011 | Ishii | ...................... | H04W 88/04 370/338 |
| 2011/0280233 A1* | 11/2011 | Choi | .................. | H04L 63/0853 370/338 |
| 2012/0039248 A1* | 2/2012 | Schneider | ........... | H04W 84/005 370/328 |
| 2012/0044522 A1 | 2/2012 | Park et al. | | |
| 2012/0051344 A1* | 3/2012 | Taylor | .................. | H04W 48/18 370/338 |
| 2012/0063327 A1* | 3/2012 | Sakai | .................... | H04W 28/18 370/242 |
| 2012/0069827 A1* | 3/2012 | Lee | .................... | H04W 52/0274 370/338 |
| 2012/0099572 A1* | 4/2012 | Kato | ..................... | H04W 88/06 370/338 |
| 2012/0254614 A1* | 10/2012 | Kimura | ................. | H04W 12/04 713/168 |
| 2013/0016710 A1* | 1/2013 | Shinohara | ........... | H04M 1/7253 370/338 |
| 2013/0100855 A1 | 4/2013 | Jung et al. | | |
| 2013/0107796 A1* | 5/2013 | Du | ........................ | H04W 88/04 370/315 |
| 2013/0148149 A1* | 6/2013 | Park | ...................... | G06F 3/1296 358/1.13 |
| 2013/0173702 A1* | 7/2013 | Lang | ..................... | H04W 12/06 709/204 |
| 2013/0182693 A1* | 7/2013 | Sperling | ........... | H04W 52/0229 370/338 |
| 2013/0185813 A1* | 7/2013 | Shim | ....................... | G06F 8/654 726/29 |
| 2014/0028817 A1* | 1/2014 | Brockway, III | .... | H04N 5/23245 348/61 |
| 2014/0028818 A1* | 1/2014 | Brockway, III | .... | H04N 5/23206 348/61 |
| 2014/0213244 A1* | 7/2014 | Oh | ........................ | H04W 88/04 455/419 |
| 2014/0219148 A1* | 8/2014 | Zhao | ................. | H04W 52/0229 370/311 |
| 2014/0254799 A1* | 9/2014 | Husted | .................. | H04W 76/38 380/270 |
| 2014/0323053 A1* | 10/2014 | Yamaoka | .......... | H04W 52/0229 455/41.2 |
| 2014/0376448 A1* | 12/2014 | Kao | ........................ | H04N 7/181 370/315 |
| 2015/0045018 A1* | 2/2015 | Liu | .......................... | H04L 1/00 455/426.1 |
| 2015/0215981 A1* | 7/2015 | Patil | .................... | H04W 72/1263 370/329 |
| 2015/0334749 A1 | 11/2015 | Goto | | |
| 2015/0365983 A1* | 12/2015 | Zhou | ..................... | H04W 76/10 370/338 |
| 2017/0105208 A1* | 4/2017 | Hedayat | ............. | H04W 72/048 |

FOREIGN PATENT DOCUMENTS

| | | |
|---|---|---|
| EP | 2562985 A1 | 2/2013 |
| JP | 2010056951 A | 3/2010 |
| JP | 2014128018 A | 7/2014 |

OTHER PUBLICATIONS

Foreign Communication From a Counterpart Application, Japanese Application No. 2017-510484, Japanese Office Action dated May 8, 2018, 4 pages.
Foreign Communication From a Counterpart Application, European Application No. 14900166.1, Extended European Search Report dated Aug. 3, 2017, 11 pages.
Foreign Communication From a Counterpart Application, PCT Application No. PCT/CN2014/085034, English Translation of International Search Report dated May 28, 2015, 2 pages.
Foreign Communication From a Counterpart Application, PCT Application No. PCT/CN2014/085034, English Translation of Written Opinion dated May 28, 2015, 7 pages.

* cited by examiner

METHOD FOR ESTABLISHING NETWORK CONNECTION BY USING WPS, AND MOBILE WI-FI DEVICE

CROSS-REFERENCE TO RELATED APPLICATIONS

This application is a national stage application of international patent application number PCT/CN2014/085034 filed on Aug. 22, 2014, which is incorporated by reference.

TECHNICAL FIELD

The present disclosure relates to the field of communications technologies, and in particular, to a method for establishing a network connection by using Wi-Fi Protected Setup (WPS), and a mobile Wi-Fi device.

BACKGROUND

At present, a mobile Wi-Fi device can connect a user terminal that has a Wi-Fi function to the Internet by providing a wireless network such as Wi-Fi. Most of current mobile Wi-Fi devices have a WPS function. The WPS function may be used to simplify a procedure of setting encryption authentication of the wireless network, and may be enabled in a form such as setting a personal identification number (PIN) or pressing a key. Therefore, a user only needs to perform an operation such as pressing a key or setting a PIN, and the mobile Wi-Fi device can exchange a security key with a user terminal device, and further perform a wireless network connection.

However, when the WPS is enabled, a current mobile Wi-Fi device can only select one fixed interface. If it is preset that the WPS selects an AP side interface, as functions of a user terminal device become diverse, that the WPS selects one fixed interface cannot meet a functional requirement of the user terminal device. The user terminal device, such as a mobile phone or a portable computer, may serve as an access point (AP) device. When a mobile phone serves as the access point device, the mobile phone cannot connect successfully to the mobile Wi-Fi device by using the WPS if the current mobile Wi-Fi device presets the WPS to select the AP side interface, which is inconvenient for a user to perform an operation, and diminishes user experience.

SUMMARY

Embodiments of the present disclosure disclose a method for establishing a network by using WPS, and a mobile Wi-Fi device, so as to make a user equipment (UE) connect successfully to the mobile Wi-Fi device, and enhance user experience.

A first aspect of the embodiments of the present disclosure discloses a method for establishing a network by using WPS, where the method may include: receiving, by a mobile Wi-Fi device, a connection request sent by a UE; determining, according to the connection request, that the UE enables a connection mode of a WPS function, where the connection mode includes an access point mode and a station mode; enabling, according to the connection mode, a WPS interface, of the mobile Wi-Fi device, that is corresponding to the connection mode; and establishing a WPS network connection to the UE by using the WPS interface.

With reference to the first aspect of the embodiments of the present disclosure, in a first possible implementation manner of the first aspect of the embodiments of the present disclosure, before the determining, according to the connection request, that the UE enables a connection mode of a WPS function, the method further includes: detecting whether WPS information exists in the connection request; and the determining, according to the connection request, that the UE enables a connection mode of a WPS function includes: determining, if the WPS information is detected, that the connection mode, of the WPS function, enabled by the UE is the access point mode or the station mode.

With reference to the first possible implementation manner of the first aspect of the embodiments of the present disclosure, in a second possible implementation manner of the first aspect of the embodiments of the present disclosure, the determining, if the WPS information is detected, that the connection mode, of the WPS function, enabled by the UE is the access point mode or the station mode includes: detecting identification information, of the connection mode, in the WPS information, where the identification information indicates that the connection mode of the UE is the access point mode or the station mode; and confirming, according to the identification information, that the connection mode is the access point mode or the station mode.

With reference to the first aspect of the embodiments of the present disclosure or the first or the second possible implementation manner of the first aspect of the embodiments of the present disclosure, in a third possible implementation manner of the first aspect of the embodiments of the present disclosure, the enabling, according to the connection mode, a WPS interface, of the mobile Wi-Fi device, that is corresponding to the connection mode includes: enabling a station side WPS interface of the mobile Wi-Fi device after it is confirmed that the connection mode of the UE is the access point mode; and enabling an access point side WPS interface of the mobile Wi-Fi device after it is confirmed that the connection mode of the UE is the station mode.

A second aspect of the embodiments of the present disclosure discloses a mobile Wi-Fi device, where the device may include: a connection request receiving module configured to receive a connection request sent by a UE; a connection mode determining module configured to determine, according to the connection request, that the UE enables a connection mode of a WPS function, where the connection mode includes an access point mode and a station mode; an enabling module configured to enable, according to the connection mode, a WPS interface, of the mobile Wi-Fi device, that is corresponding to the connection mode; and an establishing module configured to establish a WPS network connection to the UE by using the WPS interface enabled by the enabling module.

With reference to the second aspect of the embodiments of the present disclosure, in a first possible implementation manner of the second aspect of the embodiments of the present disclosure, the device further includes: a WPS detection module configured to detect whether WPS information exists in the connection request; and the connection mode determining module is further configured to: determine, when the WPS detection module detects the WPS information, that the connection mode, of the WPS function, enabled by the UE is the access point mode or the station mode. With reference to the first possible implementation manner of the second aspect of the embodiments of the present disclosure, in a second possible implementation manner of the second aspect of the embodiments of the present disclosure, the connection mode determining module includes: an identification information detection unit configured to detect identification information, of the connection mode, in the WPS information, where the identification information indicates that the connection mode of the UE is the access point mode or the station mode; and a connection mode confirmation unit configured to confirm, according to the identification information, that the connection mode is the access point mode or the station mode.

With reference to the second aspect of the embodiments of the present disclosure or the first or the second possible implementation manner of the second aspect of the embodiments of the present disclosure, in a third possible implementation manner of the second aspect of the embodiments of the present disclosure, the enabling module includes: a station side enabling unit configured to enable a station side WPS interface of the mobile Wi-Fi device after it is confirmed that the connection mode of the UE is the access point mode; and an access point side enabling unit configured to enable an access point side WPS interface of the mobile Wi-Fi device after it is confirmed that the connection mode of the UE is the station mode.

A third aspect of the embodiments of the present disclosure discloses a mobile Wi-Fi device, where the device may include: a processor and a memory, where the memory stores a group of program code, and the processor is configured to invoke the program code stored in the memory to perform the following operations: receiving a connection request sent by a UE; determining, according to the connection request, that the UE enables a connection mode of a WPS function, where the connection mode includes an access point mode and a station mode; enabling, according to the connection mode, a WPS interface, of the mobile Wi-Fi device, that is corresponding to the connection mode; and establishing a WPS network connection to the UE by using the WPS interface.

With reference to the third aspect of the embodiments of the present disclosure, in a first possible implementation manner of the third aspect of the embodiments of the present disclosure, before performing the step of determining, according to the connection request, that the UE enables a connection mode of a WPS function, the processor is further configured to invoke the program code stored in the memory to perform the following operations: detecting whether WPS information exists in the connection request according to the connection request sent by the UE; and the determining, according to the connection request, that the UE enables a connection mode of a WPS function includes: determining, if the WPS information is detected, that the connection mode, of the WPS function, enabled by the UE is the access point mode or the station mode.

With reference to the first possible implementation manner of the third aspect of the embodiments of the present disclosure, in a second possible implementation manner of the third aspect of the embodiments of the present disclosure, if the WPS information is detected, a specific manner in which the processor determines that the connection mode, of the WPS function, enabled by the UE is the access point mode or the station mode is: detecting identification information, of the connection mode, in the WPS information, where the identification information indicates that the connection mode of the UE is the access point mode or the station mode; and confirming, according to the identification information, that the connection mode is the access point mode or the station mode.

With reference to the third aspect of the embodiments of the present disclosure, the first or the second possible implementation manner of the third aspect of the embodiments of the present disclosure, in a third possible implementation manner of the third aspect of the embodiments of the present disclosure, a specific manner in which the processor enables, according to the connection mode, a WPS interface, of the mobile Wi-Fi device, that is corresponding to the connection mode is: enabling a station side WPS interface of the mobile Wi-Fi device after it is confirmed that the connection mode of the UE is the access point mode; and enabling an access point side WPS interface of the mobile Wi-Fi device after it is confirmed that the connection mode of the UE is the station mode.

A fourth aspect of the embodiments of the present disclosure discloses a computer storage medium, where the computer storage medium may store a program, and when the program is executed, a part or all of the steps included in the method according to any one of claims 1 to 4 are performed.

In the embodiments of the present disclosure, the mobile Wi-Fi device can automatically identify a WPS interface corresponding to a connection mode by determining that a UE enables the connection mode of a WPS function, and establishes a WPS connection to the UE by enabling a corresponding WPS interface. Therefore, regardless of whether the connection mode of the UE is an access point mode or a station mode, the mobile Wi-Fi device can perform a WPS network connection to the UE, which simplifies a user operation, and enhances user experience.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure disclose a method for establishing a network connection by using WPS, and a mobile Wi-Fi device, which can simplify a user operation. Details are described in the following separately. The mobile Wi-Fi device mentioned in the embodiments of the present disclosure may include a terminal device, and may also include another mobile device that can connect, in a Wi-Fi manner, or the like, a user terminal device to a second-generation wireless telephone technology (2G), third-generation wireless telephone technology (3G), or fourth-generation wireless telephone technology (4G) network. A UE mentioned in the embodiments of the present disclosure may serve as an access point device, and may serve as a station device. That is, the UE may have an AP function and a station function at the same time. The UE may include a terminal device that can serve as a hotspot, such as a mobile phone, a tablet computer, or a personal computer, and may include a router that can serve as a hotspot or an indirect hotspot, or include a modem that has a routing function, or the like.

Figure 1:
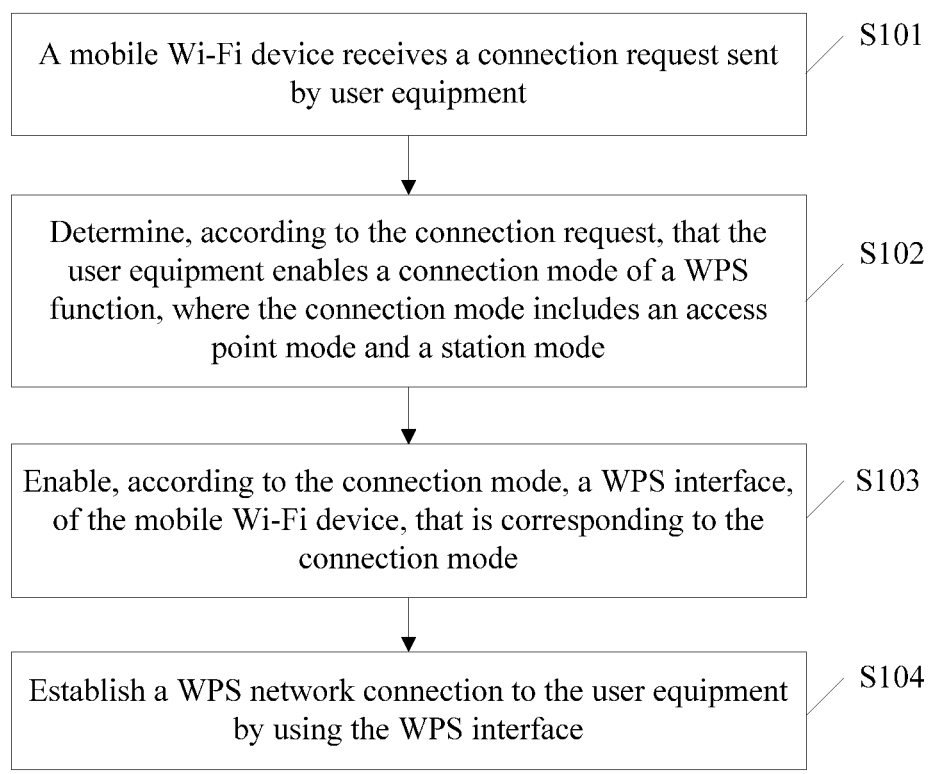
FIG. 1 is a flowchart of a method for establishing a network connection by using WPS according to an embodiment of the present disclosure.

Refer to FIG. 1, which is a flowchart of a method for establishing a network connection by using WPS according to an embodiment of the present disclosure. As shown in FIG. 1, the method may include the following steps.

Step S101: A mobile Wi-Fi device receives a connection request sent by a UE.

Step S102: Determine, according to the connection request, that the UE enables a connection mode of a WPS function, where the connection mode includes an access point mode and a station mode.

In an embodiment, when expecting that a network connection be established between the UE and the mobile Wi-Fi device in a WPS manner, a user may separately enable the WPS function of the UE and that of the mobile Wi-Fi device. Specifically, the WPS function of the UE and that of the mobile Wi-Fi device may be enabled by pressing a key, or entering a PIN, or the like. After receiving the connection request sent by the UE, the mobile Wi-Fi device may further determine that the UE enables the connection mode of the WPS function. If the connection mode is the access point mode, it indicates that a current state of the UE is an AP device, and another terminal device is allowed to connect to the UE. If the connection mode is the station mode, it indicates that the current state of the UE is a station device, and needs to connect to the mobile Wi-Fi device.

Step S103: Enable, according to the connection mode, a WPS interface, of the mobile Wi-Fi device, that is corresponding to the connection mode.

In an embodiment, the mobile Wi-Fi device may set WPS interfaces on two sides, which are respectively a station side WPS interface and an access point side WPS interface. After the connection mode of the UE is determined, a corresponding WPS interface may be enabled. Specifically, if it is determined that the connection mode of the UE is the access point mode, it indicates that the current state of the UE is an AP device, and the corresponding station side WPS interface needs to be enabled, which indicates that the mobile Wi-Fi device currently serves as a station to connect to the UE. If it is determined that the connection mode of the UE is the station mode, it indicates that the current state of the UE is a station device, and the corresponding access point side WPS interface needs to be enabled, which indicates that the mobile Wi-Fi device currently serves as a hotspot, that is, the AP device, to implement a connection to the UE.

Step S104: Establish a WPS network connection to the UE by using the WPS interface.

In an embodiment, after enabling the WPS interface corresponding to the connection mode, the mobile Wi-Fi device may initialize a parameter of the WPS interface, so as to enable the mobile Wi-Fi device to perform the WPS network connection to the UE. Specifically, after enabling the access point side WPS interface, the mobile Wi-Fi device may feed back detection feedback information that includes WPS information to the user equipment, and may establish a communication handshake with the user equipment, thereby performing data communication; after enabling the station side WPS interface, the mobile Wi-Fi device may send detection request information that includes the WPS information to the user equipment, to request to perform a connection to the user equipment, and may establish a communication handshake with the user equipment after receiving detection feedback information from the user equipment, thereby performing data communication.

In this embodiment of the present disclosure, a mobile Wi-Fi device can automatically identify a WPS interface corresponding to a connection mode by determining that user equipment enables the connection mode of a WPS function, and establishes a WPS connection to the user equipment by enabling a corresponding WPS interface. Therefore, regardless of whether the connection mode of the user equipment is an access point mode or a station mode, the mobile Wi-Fi device can perform a WPS network connection to it, which simplifies a user operation, and enhances user experience.

Figure 2:
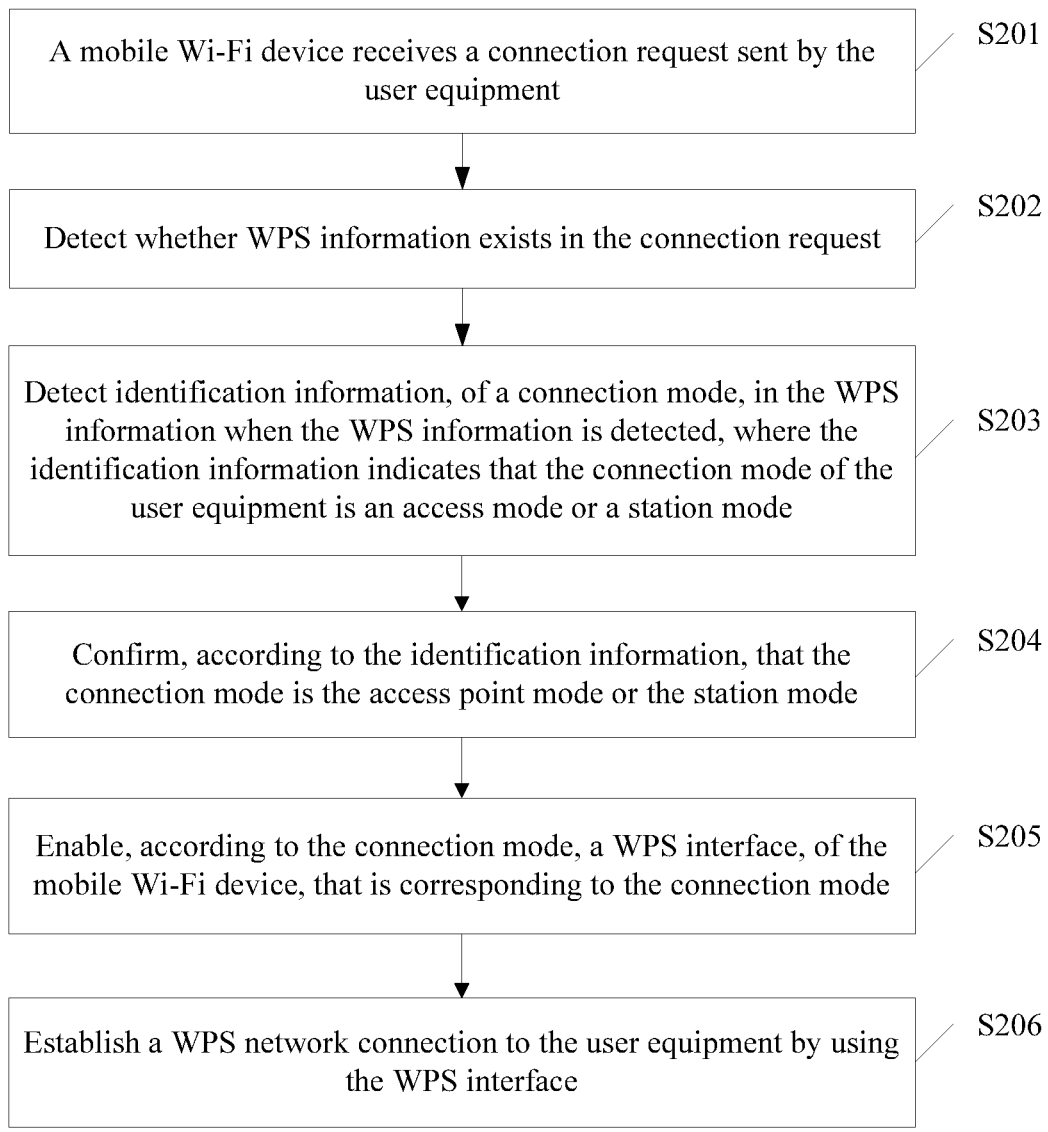
FIG. 2 is a flowchart of another method for establishing a network connection by using WPS according to an embodiment of the present disclosure.

Refer to FIG. 2, which is a flowchart of a method for establishing a network connection by using WPS according to an embodiment of the present disclosure. As shown in FIG. 2, the method may include the following steps.

Step S201: A mobile Wi-Fi device receives a connection request sent by the user equipment.

Step S202: Detect whether WPS information exists in the connection request.

In an embodiment, the mobile Wi-Fi device may receive the connection request sent by the user equipment, and detects whether the WPS information exists in the connection request. If the user equipment is an AP device, the user equipment may broadcast a beacon (Beacon) packet, to indicate that another device may connect to the user equipment, and the beacon packet may include the WPS information, which indicates that the user equipment enables a WPS function. If the user equipment is a station device, the user equipment may broadcast the connection request, expecting to establish a network connection to a hotspot device. When the mobile Wi-Fi device receives, in either of the foregoing cases, the connection request that includes the WPS information and that is broadcasted by the user equipment, it indicates that the user equipment has enabled the WPS function.

Step S203: Detect identification information, of a connection mode, in the WPS information when the WPS information is detected, where the identification information indicates that the connection mode of the user equipment is an access point mode or a station mode.

Step S204: Confirm, according to the identification information, that the connection mode is the access point mode or the station mode.

In an embodiment, the identification information, of the connection mode, in the WPS information may be further detected after the WPS information is detected, where the identification information may indicate that the connection mode of the user equipment is the access point mode or the station mode. If the user equipment serves as the AP device, the mobile Wi-Fi device may receive the identification information broadcasted by the user equipment, such as beacon information; when the beacon information is detected, it indicates that the user equipment currently serves as the AP device, and it may be determined that the connection mode of the user equipment is the access point mode. The identification information may also be detection connection request information. If the WPS information includes a detection connection request, it indicates that the user equipment expects to establish a connection to another device, so as to connect to a network, and it may be confirmed that a current state of the user equipment is the station device, and it may be confirmed that the connection mode of the user equipment is the station mode.

Step S205: Enable, according to the connection mode, a WPS interface, of the mobile Wi-Fi device, that is corresponding to the connection mode.

Optionally, this step may include the following steps: enabling a station side WPS interface of the mobile Wi-Fi device after it is confirmed that the connection mode of the user equipment is the access point mode; and enabling an access point side WPS interface of the mobile Wi-Fi device after it is confirmed that the connection mode of the user equipment is the station mode.

In an embodiment, after confirming the connection mode of the user equipment, the mobile Wi-Fi device may enable a corresponding WPS interface according to a confirmed connection mode. If it is confirmed that the connection mode of the user equipment is the access point mode, the corresponding station side WPS interface may be enabled on the mobile Wi-Fi device, which indicates that the mobile Wi-Fi device may serve as a station to send a detection connection request to the user equipment, expecting to establish a WPS connection. If it is confirmed that the connection mode of the user equipment is the station mode, the corresponding access point side WPS interface may be enabled on the mobile Wi-Fi device, which indicates that the mobile Wi-Fi device may serve as an AP end to receive a detection connection request sent by the user equipment, and may send a detection feedback request to the user equipment, indicating that a WPS network connection can be established.

Step S206: Establish a WPS network connection to the user equipment by using the WPS interface.

In an embodiment, after enabling the WPS interface corresponding to the connection mode, the mobile Wi-Fi device may initialize a parameter of the WPS interface, so as to enable the mobile Wi-Fi device to perform the WPS network connection to the user equipment. Specifically, after enabling the access point side WPS interface, the mobile Wi-Fi device may feed back detection feedback information that includes the WPS information to the user equipment, and may establish a communication handshake with the user equipment, thereby performing data communication; after enabling the station side WPS interface, the mobile Wi-Fi device may send detection request information that includes the WPS information to the user equipment, to request to perform a connection to the user equipment, and may establish a communication handshake with the user equipment after receiving detection feedback information from the user equipment, thereby performing data communication.

In an optional embodiment, after enabling the access point side WPS interface, to establish the network with the user equipment by using the WPS in a specific time, for example, in two minutes, the mobile Wi-Fi device may continue to detect the connection mode of the user equipment, for example, detect whether information broadcasted by the user equipment includes the beacon information. If the beacon information, or the identification information indicating that the user equipment serves as the AP device is re-detected, the mobile Wi-Fi device can automatically switch the WPS interface, that is, turn to enable the station side WPS interface, so as to establish the connection to the user equipment.

In this embodiment of the present disclosure, a mobile Wi-Fi device can automatically identify a WPS interface corresponding to a connection mode by determining that user equipment enables the connection mode of a WPS function, and establishes a WPS connection to the user equipment by enabling a corresponding WPS interface. Therefore, regardless of whether the connection mode of the user equipment is an access point mode or a station mode, the mobile Wi-Fi device can perform a WPS network connection to the user equipment, which simplifies a user operation, and enhances user experience.

Figure 3:
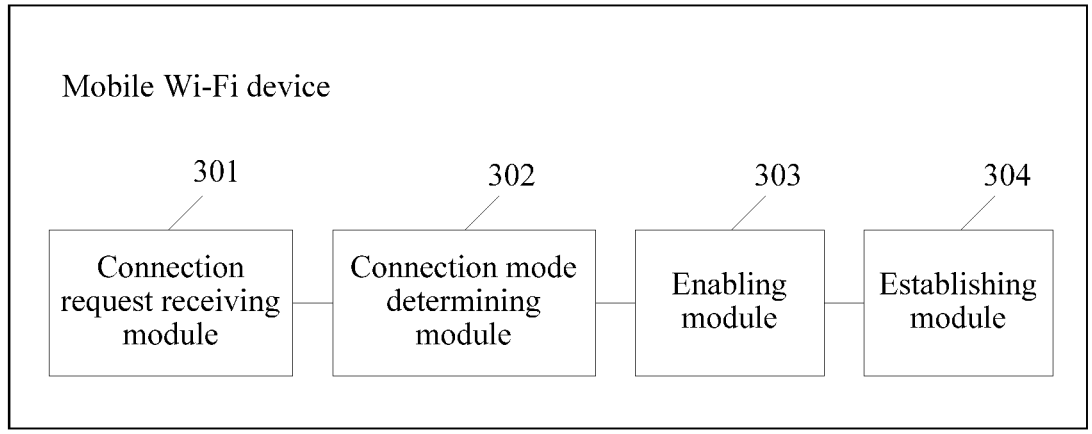
FIG. 3 is a structural diagram of a mobile Wi-Fi device according to an embodiment of the present disclosure.

Refer to FIG. 3, which is a structural diagram of a mobile Wi-Fi device according to an embodiment of the present disclosure. As shown in FIG. 3, the mobile Wi-Fi device may include at least: a connection request receiving module 301, a connection mode determining module 302, an enabling module 303, and an establishing module 304.

The connection request receiving module 301 is configured to receive a connection request sent by user equipment.

The connection mode determining module 302 is configured to determine, according to the connection request, that the user equipment enables a connection mode of a WPS function, where the connection mode includes an access point mode and a station mode.

In an embodiment, when expecting that a network connection be established between the user equipment and the mobile Wi-Fi device in a WPS manner, a user may separately enable the WPS function of the user equipment and that of the mobile Wi-Fi device. Specifically, the WPS function of the user equipment and that of the mobile Wi-Fi device may be enabled by pressing a key, or entering a PIN, or the like. After receiving the connection request sent by the user equipment by using the connection request receiving module 301, the mobile Wi-Fi device may further determine, by using the connection mode determining module 302, that the user equipment enables the connection mode of the WPS function, where if the connection mode is the access point mode, it indicates that a current state of the user equipment is an AP device, and another terminal device is allowed to connect to the user equipment. If the connection mode is the station mode, it indicates that the current state of the user equipment is a station device, and the user equipment needs to connect to the mobile Wi-Fi device.

The enabling module 303 is configured to enable, according to the connection mode, a WPS interface, of the mobile Wi-Fi device, that is corresponding to the connection mode.

In an embodiment, the mobile Wi-Fi device may set WPS interfaces on two sides, which are respectively a station side WPS interface and an access point side WPS interface. After the connection mode of the user equipment is determined, a corresponding WPS interface may be enabled by using the enabling module 303. Specifically, if it is determined that the connection mode of the user equipment is the access point mode, it indicates that the current state of the user equipment is an AP device, and the corresponding station side WPS interface needs to be enabled, which indicates that the mobile Wi-Fi device currently serves as a station to connect to the user equipment. If it is determined that the connection mode of the user equipment is the station mode, it indicates that the current state of the user equipment is a station device, and the corresponding access point side WPS interface needs to be enabled, which indicates that the mobile Wi-Fi device currently serves as a hotspot, that is, the AP device, to implement a connection to the user equipment.

The establishing module 304 is configured to establish a WPS network connection to the user equipment by using the WPS interface enabled by the enabling module 303.

In an embodiment, after enabling the WPS interface corresponding to the connection mode, the mobile Wi-Fi device may initialize a parameter of the WPS interface by using the establishing module 304, so as to enable the mobile Wi-Fi device to perform the WPS network connection to the user equipment. Specifically, after enabling the access point side WPS interface, the mobile Wi-Fi device may feed back detection feedback information that includes WPS information to the user equipment, and may establish a communication handshake with the user equipment, thereby performing data communication; after enabling the station side WPS interface, the mobile Wi-Fi device may send detection request information that includes the WPS information to the user equipment, to request to perform a connection to the user equipment, and may establish a communication handshake with the user equipment after receiving detection feedback information from the user equipment, thereby performing data communication.

In this embodiment of the present disclosure, the mobile Wi-Fi device can automatically identify a WPS interface corresponding to a connection mode by determining that user equipment enables the connection mode of a WPS function, and establishes a WPS connection to the user equipment by enabling a corresponding WPS interface. Therefore, regardless of whether the connection mode of the user equipment is an access point mode or a station mode, the mobile Wi-Fi device can perform a WPS network connection to the user equipment, which simplifies a user operation, and enhances user experience.

Figure 4:
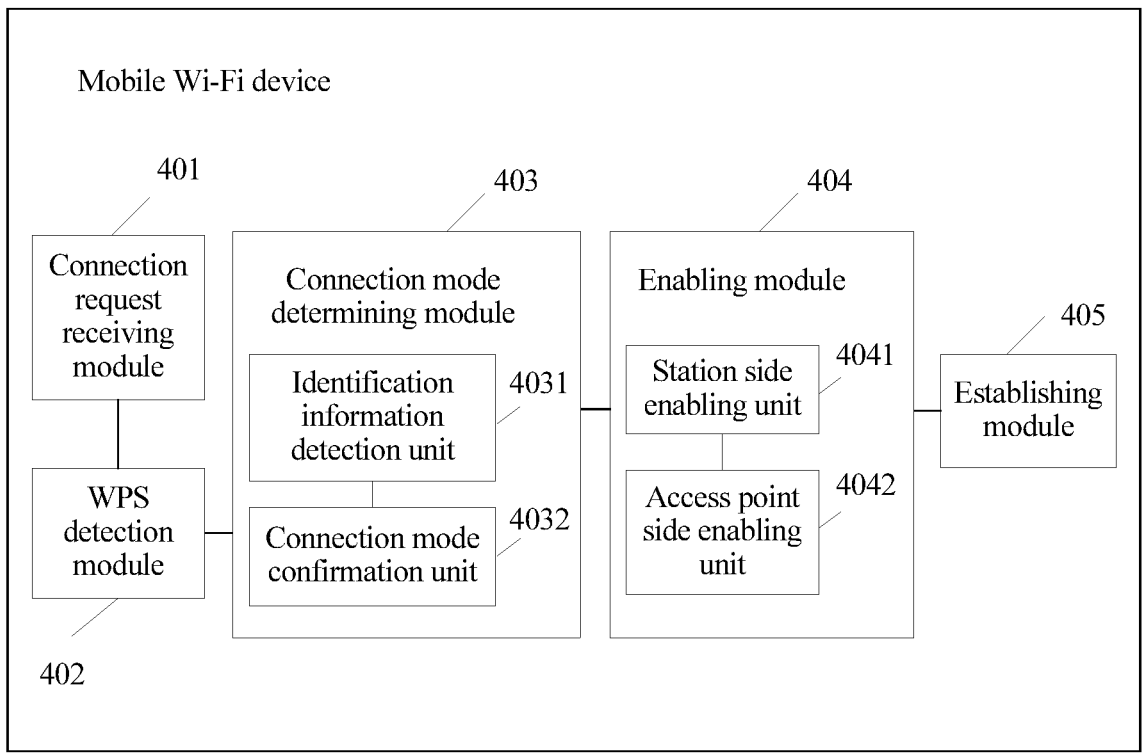
FIG. 4 is a structural diagram of another mobile Wi-Fi device according to an embodiment of the present disclosure.

Refer to FIG. 4, which is a structural diagram of another mobile Wi-Fi device according to an embodiment of the present disclosure. As shown in FIG. 4, the mobile Wi-Fi device may include at least: a connection request receiving module 401, a WPS detection module 402, a connection mode determining module 403, an enabling module 404, and an establishing module 405.

The connection request receiving module 401 is configured to receive a connection request sent by user equipment.

The WPS detection module 402 is configured to detect whether WPS information exists in the connection request.

In an embodiment, the mobile Wi-Fi device may receive the connection request sent by the user equipment by using the connection request receiving module 401, and detects, by using the WPS detection module 402, whether the WPS information exists in the connection request. If the user equipment is an AP device, the user equipment may broadcast a beacon packet, to indicate that another device may connect to the user equipment, and the beacon packet may include the WPS information, which indicates that the user equipment enables a WPS function. If the user equipment is a station device, the user equipment may broadcast the connection request, expecting to establish a network connection to a hotspot device. When the mobile Wi-Fi device receives the connection request that includes the WPS information by using the foregoing module, it indicates that the user equipment has enabled the WPS function.

The connection mode determining module 403 is configured to determine, when the WPS information is detected, that a connection mode, of a WPS function, enabled by the user equipment is an access point mode or a station mode.

In an embodiment, the connection mode determining module 403 may include the following units: an identification information detection unit 4031 configured to detect identification information, of the connection mode, in the WPS information, where the identification information indicates that the connection mode of the user equipment is the access point mode or the station mode; and a connection mode confirmation unit 4032 configured to confirm, according to the identification information, that the connection mode is the access point mode or the station mode.

In an embodiment, the identification information detection unit 4031 may detect the identification information, of the connection mode, in the WPS information, and the connection mode confirmation unit 4032 may confirm a specific connection mode of the user equipment according to the identification information, where the identification information may indicate that the connection mode of the user equipment is the access point mode or the station mode. If the user equipment serves as the AP device, the mobile Wi-Fi device may receive the identification information broadcasted by the user equipment, such as beacon information; when the beacon information is detected, it indicates that the user equipment currently serves as the AP device, and it may be determined that the connection mode of the user equipment is the access point mode. The identification information may also be detection connection request information. If the WPS information includes a detection connection request, it indicates that the user equipment expects to establish a connection to another device, so as to connect to a network, and it may be confirmed that a current state of the user equipment is the station device, and it may be confirmed that the connection mode of the user equipment is the station mode. The enabling module 404 is configured to enable, according to the connection mode, a WPS interface, of the mobile Wi-Fi device, that is corresponding to the connection mode.

In an embodiment, the enabling module may include the following units: a station side enabling unit 4041 configured to enable a station side WPS interface of the mobile Wi-Fi device after it is confirmed that the connection mode of the user equipment is the access point mode; and an access point side enabling unit 4042 configured to enable an access point side WPS interface of the mobile Wi-Fi device after it is confirmed that the connection mode of the user equipment is the station mode.

In an embodiment, after confirming the connection mode of the user equipment, the mobile Wi-Fi device may enable a corresponding WPS interface according to a confirmed connection mode. If it is confirmed that the connection mode of the user equipment is the access point mode, the corresponding station side WPS interface may be enabled on the mobile Wi-Fi device by using the station side enabling unit 4041, which indicates that the mobile Wi-Fi device may serve as a station to send a detection connection request to the user equipment, expecting to establish a WPS connection. If it is confirmed that the connection mode of the user equipment is the station mode, the corresponding access point side WPS interface may be enabled on the mobile Wi-Fi device by using the access point side enabling unit 4042, which indicates that the mobile Wi-Fi device may serve as an AP end to receive a detection connection request sent by the user equipment, and may send a detection feedback request to the user equipment, indicating that a WPS network connection can be established.

The establishing module 405 is configured to establish a WPS network connection to the user equipment by using the WPS interface enabled by the enabling module 404.

In an embodiment, after enabling the WPS interface corresponding to the connection mode by using the enabling module 404, the mobile Wi-Fi device may initialize a parameter of the WPS interface by using the establishing module 405, so as to enable the mobile Wi-Fi device to perform the WPS network connection to the user equipment. Specifically, after enabling the access point side WPS interface, the mobile Wi-Fi device may feed back detection feedback information that includes the WPS information to the user equipment, and may establish a communication handshake with the user equipment, thereby performing data communication; after enabling the station side WPS interface, the mobile Wi-Fi device may send detection request information that includes the WPS information to the user equipment, to request to perform a connection to the user equipment, and may establish a communication handshake with the user equipment after receiving detection feedback information from the user equipment, thereby performing data communication.

In an optional embodiment, after enabling the access point side WPS interface, to establish the network with the user equipment by using the WPS in a specific time, for example, in two minutes, the mobile Wi-Fi device may continue to detect the connection mode of the user equipment, for example, detect whether information broadcasted by the user equipment includes the beacon information. If the beacon information, or the identification information indicating that the user equipment serves as the AP device is re-detected, the mobile Wi-Fi device can automatically switch the WPS interface, that is, turn to enable the station side WPS interface, so as to establish the connection to the user equipment.

In this embodiment of the present disclosure, the mobile Wi-Fi device can automatically identify a WPS interface corresponding to a connection mode by determining that user equipment enables the connection mode of a WPS function, and establishes a WPS connection to the user equipment by enabling a corresponding WPS interface. Therefore, regardless of whether the connection mode of the user equipment is an access point mode or a station mode, the mobile Wi-Fi device can perform a WPS network connection to the user equipment, which simplifies a user operation, and enhances user experience.

Figure 5:
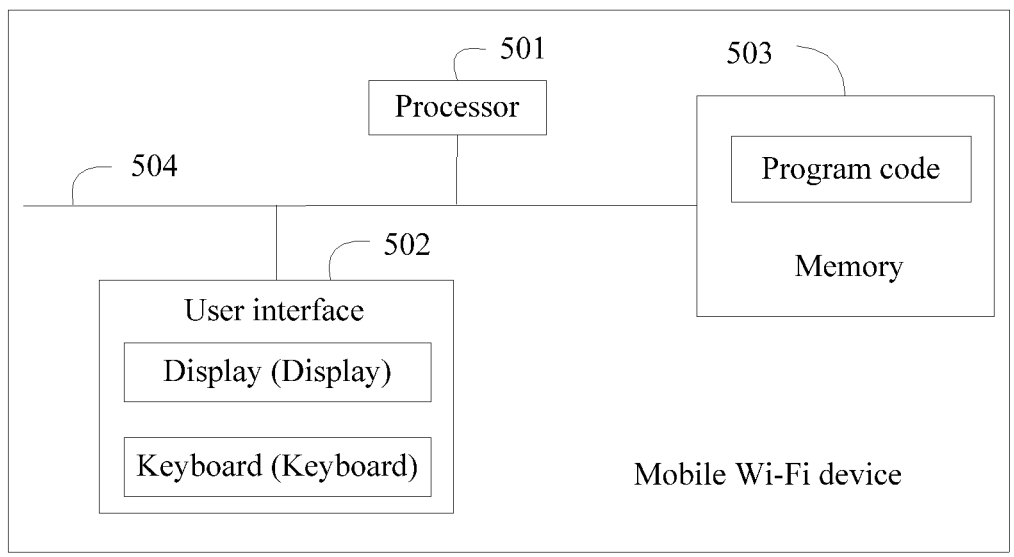
FIG. 5 is a structural diagram of still another mobile Wi-Fi device according to an embodiment of the present disclosure.

Refer to FIG. 5, which is a structural diagram of still another mobile Wi-Fi device according to an embodiment of the present disclosure. As shown in FIG. 5, the mobile Wi-Fi device may include: at least one processor 501, for example, a CPU, at least one user interface 502, a memory 503, and at least one communications bus 504. The communications bus 504 is configured to implement a connection and communication between the foregoing components. The user interface may include a display, a physical keyboard, and the like, where the display may include a liquid crystal display, a touchscreen, or the like; optionally, the user interface may further include a wired and/or a wireless interface. The memory 503 may be a high-speed random-access memory (RAM), and may also be a non-volatile memory, such as at least one magnetic disk memory. Optionally, the memory 503 may further be at least one storage apparatus that is far from the processor 501. The processor 501 may be combined with a device described in FIG. 3 and FIG. 4. The memory 503 stores a group of program code, and the processor 501 invokes the program code stored in the memory 503 to perform the following operations: receiving a connection request sent by user equipment; determining, according to the connection request, that the user equipment enables a connection mode of a WPS function, where the connection mode includes an access point mode and a station mode; enabling, according to the connection mode, a WPS interface, of the mobile Wi-Fi device, that is corresponding to the connection mode; and establishing a WPS network connection to the user equipment by using the WPS interface.

In an optional embodiment, before performing the step of determining, according to the connection request, that the user equipment enables a connection mode of a WPS function, the processor 501 is further configured to invoke the program code stored in the memory to perform the following operations: detecting whether WPS information exists in the connection request according to the connection request sent by the user equipment; and the determining, according to the connection request, that the user equipment enables a connection mode of a WPS function includes: determining, if the WPS information is detected, that the connection mode, of the WPS function, enabled by the user equipment is the access point mode or the station mode.

In an optional embodiment, if the WPS information is detected, a specific manner in which the processor determines that the connection mode, of the WPS function, enabled by the user equipment is the access point mode or the station mode is: detecting identification information, of the connection mode, in the WPS information, where the identification information indicates that the connection mode of the user equipment is the access point mode or the station mode; and confirming, according to the identification information, that the connection mode is the access point mode or the station mode.

In an optional embodiment, a specific manner in which the processor enables, according to the connection mode, a WPS interface, of the mobile Wi-Fi device, that is corresponding to the connection mode is: enabling a station side WPS interface of the mobile Wi-Fi device after it is confirmed that the connection mode of the user equipment is the access point mode; and enabling an access point side WPS interface of the mobile Wi-Fi device after it is confirmed that the connection mode of the user equipment is the station mode.

In an embodiment, the embodiment of the present disclosure further discloses a computer storage medium, where the computer storage medium stores a computer program. When the computer program in the computer storage medium is read to a computer, the computer is enabled to implement a part or all of steps in an interference elimination method disclosed by the embodiments of the present disclosure.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a RAM, a magnetic disk, and an optical disc.

The interference elimination method and apparatus provided in the embodiments of the present disclosure are described in detail above. The principle and implementation manner of the present disclosure are describes herein by using specific examples. The description about the embodiments is merely used to help understand the method and core ideas of the present disclosure. In addition, persons of ordinary skill in the art, can make modifications to the specific implementations and application scopes according to the ideas of the present disclosure. In conclusion, the content of specification shall not be construed as a limit to the present disclosure.

What is claimed is:

1. A method for establishing a network connection using Wi-Fi Protected Setup (WPS) and implemented in a mobile Wi-Fi device, the method comprising:
receiving, from a user equipment (UE), a connection request specifying that the UE enables and operates in a station-side connection mode of a WPS function;
determining, according to the connection request specifying that the UE enables and operates in the station-side connection mode, that the UE enables and operates in the station-side connection mode of the WPS function;
switching, based on the connection request specifying that the UE enables and operates in the station-side connection mode, from operating in the station-side connection mode to operating in an access point (AP) connection mode; and
establishing a WPS network connection to the UE using an AP-side WPS interface corresponding to the AP connection mode.

2. The method of claim 1, wherein before determining that the UE enables and operates in the station-side connection mode, the method further comprises detecting that the connection request includes WPS information, and wherein the method further comprises further determining, in response to the WPS information in the connection request, that the UE enables and operates in the station-side connection mode.

3. The method of claim 2, wherein determining that the UE enables and operates in the station-side connection mode comprises:
detecting identification information of a connection mode of the UE, wherein the identification information indicates that the connection mode of the UE is the station-side connection mode; and
confirming, according to the identification information, that the connection mode of the UE is the station-side connection mode.

4. A mobile Wi-Fi device comprising:
a memory comprising instructions; and
a processor coupled to the memory and configured to execute the instructions, which causes the processor to be configured to:
receive, from a user equipment (UE), a connection request specifying that the UE enables and operates in a station-side connection mode of a Wi-Fi Protected Setup (WPS) function;
determine, according to the connection request specifying that the UE enables and operates in a station-side connection mode of a Wi-Fi Protected Setup (WPS) function, that the UE enables and operates in the station-side connection mode of the WPS function;
switch, based on the connection request specifying that the UE enables and operates in the station-side connection mode, from operating in the station-side connection mode to operating in an access point (AP) connection mode; and
establish a WPS network connection to the UE using an AP-side WPS interface corresponding to the AP connection mode.

5. The mobile Wi-Fi device of claim 4, wherein before the processor determines that the UE enables and operates in the station-side connection mode, the instructions further cause the processor to be configured to detect whether the connection request includes WPS information.

6. The mobile Wi-Fi device of claim 5, wherein the instructions further cause the processor to be configured to determine that the UE enables the station-side connection mode when the connection request includes the WPS information.

7. The mobile Wi-Fi device of claim 4, wherein the instructions cause the processor to be configured to determine that the UE enables and operates in the station-side connection mode by causing the processor to be configured to:
detect identification information of the station-side connection mode, wherein the identification information indicates that the UE enables and operates in the station-side connection mode; and
confirm, according to the identification information, that the UE enables and operates in the station-side connection mode.

8. A computer program product comprising computer executable instructions stored on a non-transitory computer readable medium that, when executed by a processor, cause a mobile Wi-Fi device to:
receive, from a user equipment (UE), a connection request specifying that the UE enables and operates in a station-side connection mode of a Wi-Fi Protected Setup (WPS) function;
determine, according to the connection request specifying that the UE enables and operates in the station-side connection mode of the WPS function, that the UE enables and operates in the station-side connection mode of the WPS function;
switch, based on the connection request specifying that the UE enables and operates in the station-side connection mode, from operating in the station-side connection mode to operating in an access point (AP) connection mode; and
establish a WPS network connection to the UE using an AP-side WPS interface corresponding to the AP connection mode.

9. The computer program product of claim 8, wherein before the mobile Wi-Fi device determines that the UE enables and operates in the station-side connection mode, the computer executable instructions further cause the mobile Wi-Fi device to detect whether the connection request includes WPS information.

10. The computer program product of claim 9, wherein the computer executable instructions cause the mobile Wi-Fi device to determine that the UE enables and operates in the station-side connection mode when the connection request includes the WPS information.

11. The computer program product of claim 8, wherein the computer executable instructions further cause the mobile Wi-Fi device to further determine that the UE enables and operates in the station-side connection mode by causing the mobile Wi-Fi device to:
detect identification information of the station-side connection mode, wherein the identification information indicates that the UE enables and operates in the station-side connection mode; and confirm, according to the identification information, that the UE enables and operates in the station-side connection mode.

12. A method for establishing a network connection using Wi-Fi Protected Setup (WPS) and implemented in a mobile Wi-Fi device, the method comprising:
receiving, from a user equipment (UE), a first connection request specifying that the UE enables and operates in a station-side connection mode of a WPS function;
determining, according to the first connection request specifying that the UE enables and operates in the station-side connection mode, that the UE enables and operates in the station-side connection mode of the WPS function;
switching, based on the first connection request specifying that the UE enables and operates in the station-side connection mode, from operating in the station-side connection mode to operating in an access point (AP) connection mode;
establishing a WPS network connection to the UE using an AP-side WPS interface corresponding to the AP connection mode;
receiving, from the user equipment, a second connection request specifying that the UE enables and operates in the AP connection mode; and
switching, based on the second connection request, from operating in the AP connection mode to operating in the station-side connection mode.

\* \* \* \* \*